Dec. 29, 1959  A. WEIS  2,918,796
ELECTRO-HYDRAULIC SHIFTING DEVICE
Filed July 23, 1957  3 Sheets-Sheet 1

Inventor:
ALFRED WEIS
By Taulmin & Taulmin
Attorneys

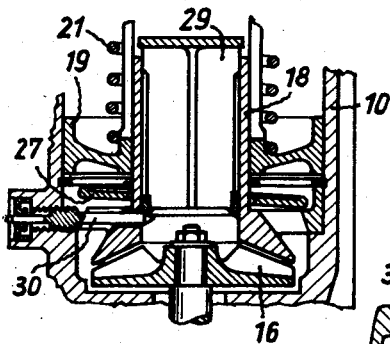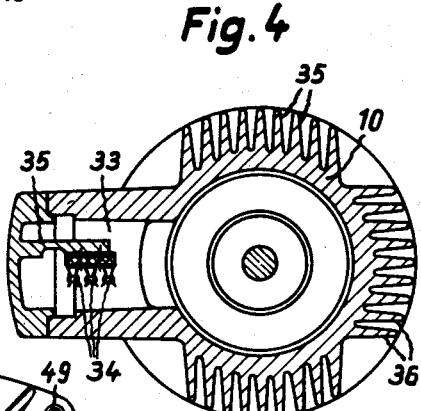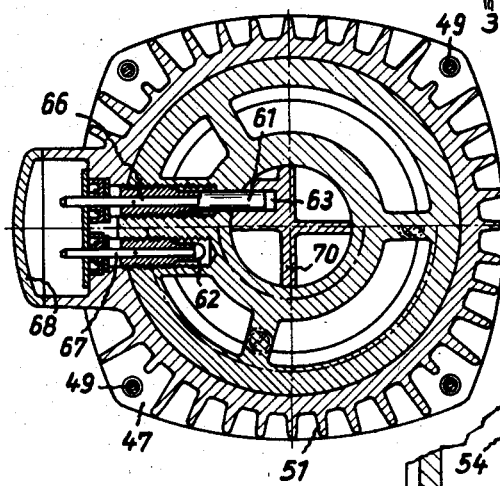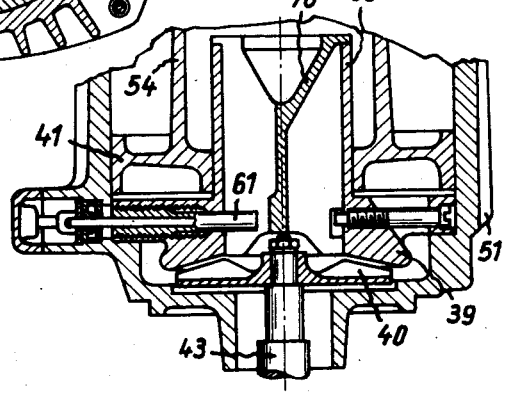

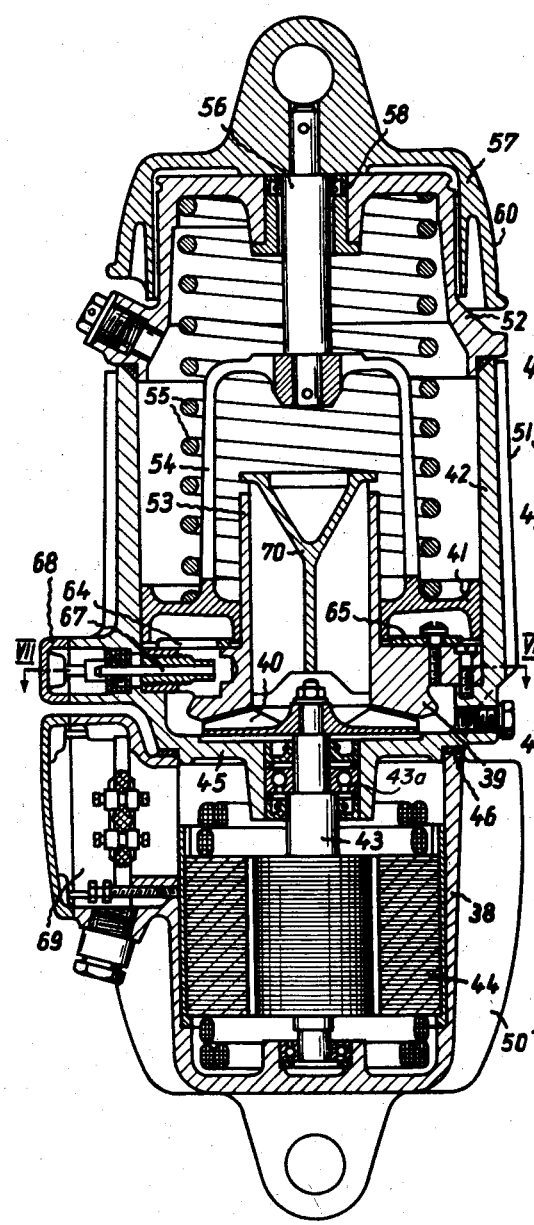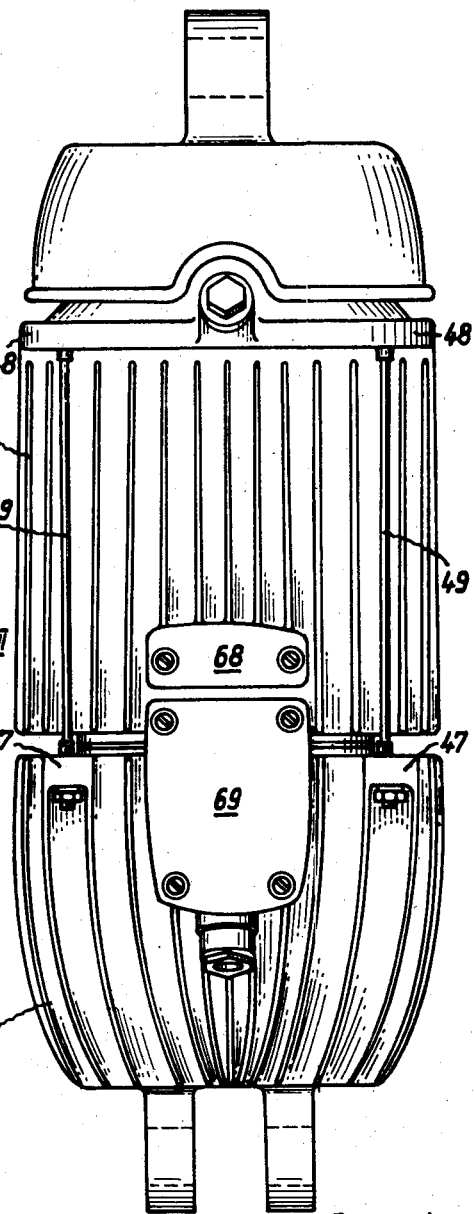

United States Patent Office 2,918,796
Patented Dec. 29, 1959

2,918,796

ELECTRO-HYDRAULIC SHIFTING DEVICE

Alfred Weis, Olpe, Germany, assignor to Elektro-Mechanik G.m.b.H., Wendenerhutte uber Olpe, Westphalia, Germany Application July 23, 1957, Serial No. 673,636

Claims priority, application Germany July 23, 1956

4 Claims. (Cl. 60—52)

The present invention relates to a shifting device and more in particular to an electro-hydraulic shifting device for brakes, clutches, valves, slides and the like.

It is known in the art to use electro-hydraulic shifting devices comprising an electric driving motor, a pump, a regulating piston actuated by a pressure medium and a piston rod. The pump is mounted upon the shaft of the driving motor in overhung position, and the motor with the shaft, the pump, the regulating piston and the piston rod are housed in a cylindrical casing separated by an intermediate wall transversely arranged relative to the pump shaft.

It is an object of the present invention to provide an electro-hydraulic shifting device, which can be more easily assembled and operated and which is therefore more reliable and less expensive both in production and operation.

It is another object of the present invention to provide an electro-hydraulic shifting device, provided with lifting and return stroke valves which can be easily controlled and adjusted even during the operation of the device.

It is still another object of the present invention to provide an electro-hydraulic shifting device, which is provided with cooling ribs so arranged that they can be produced together with the casing by mold casting.

It is yet another object of the present invention to provide an electro-hydraulic shifting device, in which the danger of overheating the motor is greatly reduced.

It is a further object of the present invention to provide an electro-hydraulic shifting device, in which the lifting and return stroke valves can be easily adjusted and in which the time of the lifting and the return stroke is less dependent upon temperature than in known devices.

Other objects and advantages will become apparent as the description of the present invention proceeds.

The afore-mentioned objects are achieved by the present invention offering a number of considerable improvements over the known electro-hydraulic shifting devices.

According to the invention the intermediate wall is cast as one integral piece together with the casing of the device. Furthermore, the suction pipe for the pump arranged at the intermediate wall which is also used as the central guide tube for the annular regulating piston is provided with a bridge partly surrounding the suction pipe. This bridge forms an integral portion of the regulating piston and the central piston rod is supported in its central portion. It is also possible to cast the central guide tube as one integral piece with the diffusor of the pump. Known electro-hydraulic shifting devices provided with lifting and return stroke valves are improved by the present invention in regard to the adjustment and the control of these valves. This adjustment is effected by regulating pins transversely protruding into the casing from the outside and accessible from the outside even during the operation of the device. The adjusting means for the lifting stroke valve can be arranged at least partly in the central guide tube. This valve may consist, for example, of a hingeably mounted flap arranged in front of the opening of the central guide tube or may consist of a slide displaceably arranged in the central guide tube. The valves are preferably adjusted by conical threaded pins which may be covered, for instance, by the lid of the adjoining terminal box.

Electro-hydraulic shifting devices are sometimes provided with cooling ribs and according to the present invention these cooling ribs are preferably arranged parallel to each other in four groups and two planes perpendicular to each other.

Furthermore, the sealing means provided where the central piston rod protrudes from the casing are protected by a bell shaped cover arranged above that respective portion of the casing. This bell shaped cover preferably has double walls, the inner wall of which rests upon the underlying cover of the casing and the outer wall of which has substantially the same diameter as the adjoining portions of the casing so as to form a stream-lined configuration with the latter.

The elecro-hydraulic shifting device can be further improved according to the invention by providing for a casing composed of two portions, the first portion of which houses the driving motor and the second portion of which houses the pump, the hydraulic medium, and the regulating piston. Between these two portions of the casing there is arranged a layer consisting of a material which conducts heat less readily than metal.

Furthermore, if lifting or return stroke valves are to be provided, these may consist of openings of variable cross section the center lines of which are arranged parallel to each other and have a longitudinal ratio of 1:10 as a maximum. This results in an easy adjustment of the valves and thereby of the duration of the lifting stroke or the return stroke of the regulating piston. In addition, the duration of the lifting stroke or the return stroke of the regulating piston is less dependent on temperature variations.

The invention will be better understood by the following detailed description of the accompanying drawings, wherein:

Figure 3 is a longitudinal sectional view of a portion of the embodiment of the electro-hydraulic shifting device shown in Figure 1 and shows the arrangement of the lifting stroke valve and the regulating pin for adjusting the same;

Figure 4 is a cross sectional view of the embodiment of the electro-hydraulic shifting device shown in Figures 1 to 3 taken along lines IV—IV of Figure 2;

Figure 5 is a top, perspective view of another embodiment of the electro-hydraulic shifting device of the invention;

Figure 6 is a longitudinal sectional view of another embodiment of the electro-hydraulic shifting device shown in Figure 5;

Figure 7 is a cross sectional view of the electro-hydraulic shifting device shown in Figure 5 taken along lines VII—VII of Figure 6;

Figure 8 is a longitudinal sectional view of a portion of the electro-hydraulic shifting device and shows the arrangement of the lifting stroke valve and its corresponding regulating pin.

Figure 2:
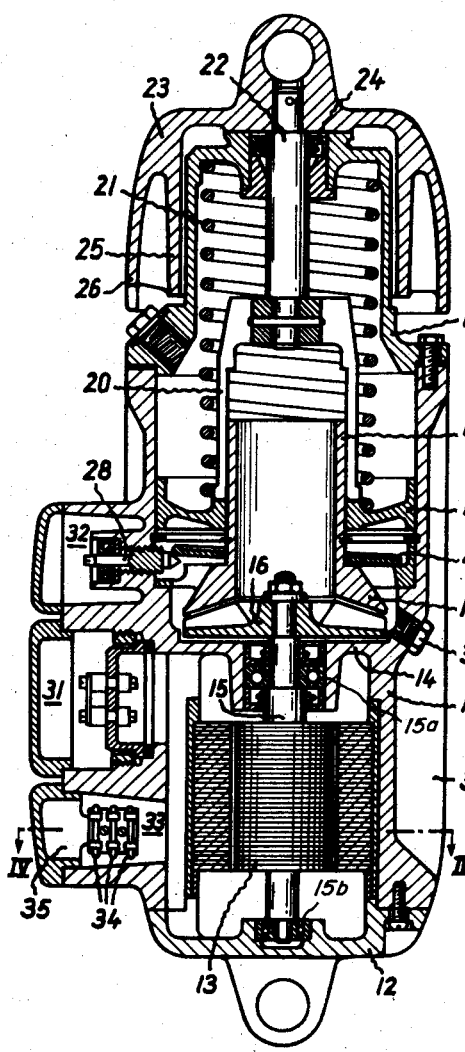
Figure 2 is a longitudinal sectional view of the embodiment of the electro-hydraulic shifting device shown in Figure 1 taken along the lines II—II in Figure 1.
Figure 1:
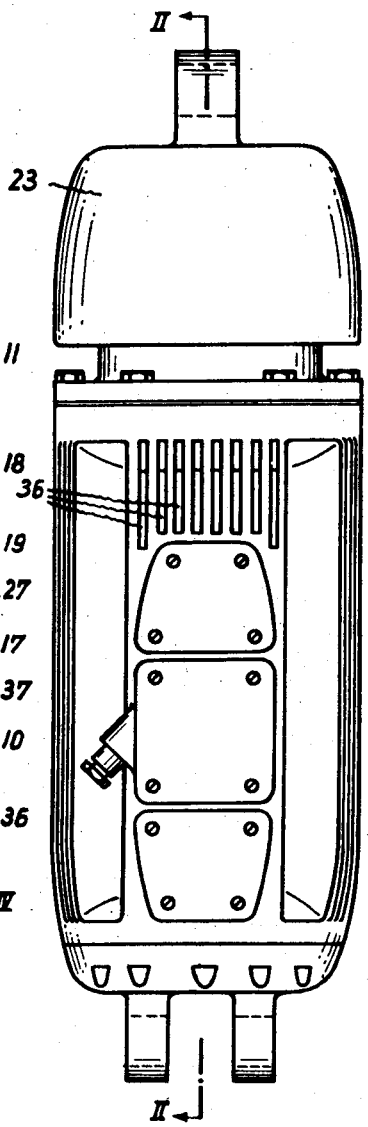
Figure 1 is a top, perspective view of one embodiment of the electro-hydraulic shifting device of the invention.

Referring now to the drawings more in detail and turning first to the embodiment shown in Figures 1 to 4, the casing 10 is covered at one of its longitudinal ends by the cover 12 and at the opposite end by the bottleneck-shaped cover 11. The cover 12 also serves as a bearing plate for the shaft 15 of the driving motor 13. The casing 10 is divided into two parts by a separating wall 14 forming an integrally cast part with the casing. The shaft 15 of the motor is supported at its right end by the cover 12 and at its opposite left end by the intermediate wall 14 and runs in bearings 15a and 15b. Upon the left end of this driving shaft there is mounted the pump impeller 16 in an overhung position. The bearing 15a in the intermediate wall 14 can be sealed against the pressure medium conveyed by the pump impeller 16 if the driving motor 13 is to be cooled by air or another cooling agent circulating in the space confined by the intermediate wall 14 and cover 12. A sealing is, of course, unnecessary if the pressure medium is also used for cooling the driving motor 13. To the left of the separating wall 14 and the pump impeller 16 there is arranged a central guide tube 18 on the periphery of which there is positioned the displaceable regulating piston 19 held in its normal, resting position by pressure spring 21. The central guide tube 18 forms an integral cast piece with the diffuser 17 of the pump impeller 16. The central guide tube 18 also forms the suction pipe for the pressure medium towards the center of the pump impeller 16. The annular regulating piston 19 is cast as one piece with the bridge 20 and is pressed to its resting position shown in Figure 2 by the spring 21 whenever the driving motor does not operate and revolve the pump impeller 16 which, in turn, displaces the regulating piston in a manner presently described. In its central left portion the bridge 20 supports the central piston rod 22 and the latter protrudes from the casing through the bottleneck-shaped cover 11. The piston rod 22 is sealed in its bearing in the bottleneck-shaped cover 11 by sealing means 24 which are protected by a bell shaped outer cover 23. Preferably this bell shaped cover has double walls, the inner wall 25 of which rests upon the cover 11 and the outer wall 26 of which has substantially the same diameter as the casing 10 so as to result in a streamlined configuration of the entire outer cover of the shifting device. Between the regulating piston 19 and the diffuser 17 there is also arranged a control valve consisting of an adjustable annular plate 27. This adjustable annular plate 27 can be raised or lowered by a conical threaded pin 28 and thereby the openings of the diffuser 17 are more or less covered by the valve.

The electro-hydraulic shifting device of the invention can be provided with a second, a lifting stroke valve as shown in Figure 3 of the drawings. This valve consists of a slide 29 arranged displaceably in the central guide tube 18. The slide can be displaced longitudinally along the central guide tube by turning thread pin 30 and as result the admission of the hydraulic means is adjusted accordingly. Thereby the delivery of the pump impeller 16 and hence the speed of the lifting stroke of the regulating piston 19 is controlled. The two thread pins 28 and 30 protrude into the interior of the casing from its periphery. They can easily be reached and adjusted from the opening 32 even while the shifting device is in operation.

For the protection of the motor 13 there are provided the plurality of temperature responsive switches 34 which are arranged adjacent to the terminal box 31. These temperature responsive switches 34 are cooled by the same cooling means associated with the motor as for example, air, oil and the like. The switches can be easily reached from the outside through opening 33. They are connected to the cover by a bridge 35 and are thus pulled out of the opening 33 whenever the cover is removed.

The casing 10 has cooling ribs 36 arranged parallel to each other and in two planes perpendicular relative to each other so that the entire casing can be manufactured by mold casting in one operation. The pressure medium can be drained from the interior of the casing through an opening normally closed by the screw 37.

Another embodiment of the electro hydraulic shifting device of the present invention is shown in Figures 5 through 8 of the accompanying drawings. The casing is composed of a portion 38 and an adjoining portion 42. The portion 38 houses the driving motor 44. The portion 42 encloses the pump impeller 40, the diffuser 39, the hydraulic medium, and the regulating piston 41. The shaft 43 of the driving motor 44 is positioned with its left end in the intermediate wall 45 which is cast as an integral piece of the casing 42. Between the casing portion 38 and 42 and at their adjoining surfaces there is arranged an isolating layer 46 of a material being less heat conductive than metal. The adjoining casing portions 38 and 42 are made as small as possible in order to reduce a heat exchange between the portion of the device housed by casing 42 and the portion enclosed by casing 38 and enclosing the motor. It is also possible to further reduce the area of the adjoining portions 38 and 42 so that they are practically sealed against each other by an air cushion. The two casing portions 38 and 42 are each cast as one integral piece and are each provided with flanges 47 and 48. They are held together by tiebars 49, which are substantially arranged on the outer periphery of the casing. The casing portions 38 and 42 are further provided with radially arranged longitudinal cooling ribs 50 and 51. The casing portion 42 is enclosed at its left end by the bottleneck-shaped cover 52. The bearing 43a for the driving shaft 43 in the intermediate wall 45 is sealed against the hydraulic means in the space enclosed by casing portion 42 to the left of the intermediate wall 45 in order to prevent a heat exchange between the hydraulic medium and the driving motor. The pump impeller 40 is mounted upon the shaft 43 in overhung position.

The central guide tube 53 for the regulating piston 41 and the diffuser 39 of the pump impeller 40 are cast as one integral piece. The central guide tube 53 is also used as the suction pipe through which the pressure medium is drawn towards the center of the pump impeller 40. The annular regulating piston 41 is mounted around the periphery of the central guide tube 53 and is cast as one integral piece with the bridge 54. The regulating piston 41 is influenced by a pressure spring 55 and as long as the driving motor 44 is not operating the piston is held by the spring 55 in its normal, resting position shown in Figure 6 of the drawings. In the center of the left end portion of the bridge 54 there is mounted the central piston rod 56 protruding through the bottleneck-shaped cover 52. The central piston rod 56 is furthermore guided through the bell shaped cover 57 arranged upon the left end of the bottleneck-shaped cover 52 and protecting the sealing means 58. At least a portion of the bell shaped cover 57 has double walls and the interior wall 59 rests upon the bottleneck-shaped cover 52 whereas the outer wall 60 has substantially the same diameter as the casing portions 38 and 42 so as to result in a streamline configuration of the entire outer cover of the electro hydraulic shifting device.

The electro-hydraulic shifting device can be equipped with a lifting stroke valve 61 and a return stroke valve 62. These valves may consist of openings of variable cross sections arranged at the inlet or outlet respectively of the pump. The center lines of these openings are arranged parallel to each other and having a length ratio of 1:10 as a maximum. In the case of the opening 63 of the lifting stroke valve 61, the parallelly arranged center lines have a longitudinal ratio of approximately 1:2. The opening 63 for the lifting stroke valve 61 is arranged in the suction pipe 53. The opening 64 for the return stroke valve 62 is provided in the annular plate 65.

The openings of the return and lifting stroke valves 62 and 61 can be adjusted in regard to their respective cross section by means of the thread pins 66 and 67 transversely protruding into the casing 42. These thread pins are easily accessible from the outside upon removing the cover 68 arranged adjacent to the terminal box 69.

The regulating piston 41 is mounted on the suction pipe 53. Within the suction pipe 53 there is arranged a body 70 dividing the suction pipe in longitudinal direction into a plurality of longitudinally extending chambers which prevent a rotation of the hydraulic pressure medium within the suction pipe.

Operation

The embodiment of the electro-hydraulic shifting device of the invention shown in Figures 1–4 operates as follows: as soon as the driving motor 13 has been switched on, the hydraulic pressure medium within the casing 10 is pressed by the pump impeller 16 through the diffuser 17 against the annular plate 27. Thereby the plate 27 is lifted and pressure fluid flows through the openings of the diffuser 17 whereupon the regulating piston 19 is lifted against the influence of pressure spring 21 which is thereby compressed. After the driving motor 13 has been switched off, the regulating piston 19 is returned to its initial, resting position by spring 21 and the hydraulic pressure medium flows back through the diffuser 17 and the pump impeller 16.

The duration of both the lifting stroke and the return stroke of the piston 19 can be adjusted by means of the improved lifting and return stroke control valves of the invention.

By turning the thread pin 30 and displacing, for example, the slide 29 in the central guide tube 18 constituting the lifting stroke valve the admission of the hydraulic pressure medium and thereby the conveying capacity of the pump can be varied. Accordingly, the lifting speed of the regulating piston 19 is adjusted.

By turning the thread pin 28 the cross section of the opening of diffuser 17 can be varied and accordingly the duration of the return stroke of the regulating piston 19 can be changed.

The embodiment of the electro-hydraulic shifting device of the invention shown in Figures 5 to 8 of the drawings operates in an analogous manner. The duration of the lifting stroke and the return stroke of the regulating piston can be adjusted by varying the respective cross section of the openings of the lifting and the return stroke valves 61 and 62, respectively.

The electro-hydraulic shifting device of the invention has been described as making use of a single-stage pump. However, it can of course also be used in combination with a multi-stage pump with only such modifications as are well within the reach of any person skilled in the art.

It will be understood that this invention is susceptible to modification in order to adapt it to different usages and conditions, and, accordingly, it is desired to comprehend such modifications within this invention as may fall within the scope of the appended claims.

What I claim is:

1. An electro-hydraulic shifting device comprising, in combination: an electric driving motor having a driving shaft; a pump impeller mounted on said driving shaft; an annular regulating piston displaceable in response to fluid pressure produced by said pump impeller; an axially extending bridge attached to said piston, said bridge having a transverse yoke portion; a centrally arranged piston rod attached to said yoke portion of said bridge; a closed housing having lower, intermediate and upper housing portions, said lower housing portion containing said motor, said driving shaft and said pump impeller, said intermediate portion containing said regulating piston and serving as a slide support therefor, and said upper housing portion having a sealed opening for slidably supporting said piston rod, a cover member covering said upper housing portion and protecting said sealed opening thereof; a compression spring arranged in said housing, surrounding said bridge and pressing against said regulating piston for biasing the same into a rest position; a suction conduit arranged interiorly of said annular regulating piston; adjustable lifting valve means having a flow-through passage formed between said suction conduit and a member located centrally therein, said cross-section of said passage remaining unchanged during adjustment of said lifting valve means; and adjustable return stroke valve means having a flow-through passage formed in an annular plate member arranged beneath said annular regulating piston, the cross-section of said last-mentioned passage remaining unchanged during adjustment of said return valve means.

2. An electro-hydraulic shifting device as defined in claim 1 wherein each of said adjustable valve means comprises a regulating member which projects through a side wall of said housing and is accessible from the exterior of said housing.

3. An electro-hydraulic shifting device as defined in claim 1 wherein said housing is composed of two pieces, and wherein an isolating layer is interposed between said two pieces.

4. An electro-hydraulic shifting device as defined in claim 1 wherein said cover member is bell-shaped.

References Cited in the file of this patent

UNITED STATES PATENTS

| | | |
|---|---|---|
| 1,935,432 | Bourst | Nov. 14, 1933 |
| 1,989,235 | Kimball | Jan. 29, 1935 |
| 2,035,813 | Johnson | Mar. 31, 1936 |
| 2,631,431 | Grebe | Mar. 17, 1953 |